(No Model.)
T. A. EDISON.
WEBERMETER.
No. 251,557. Patented Dec. 27, 1881.
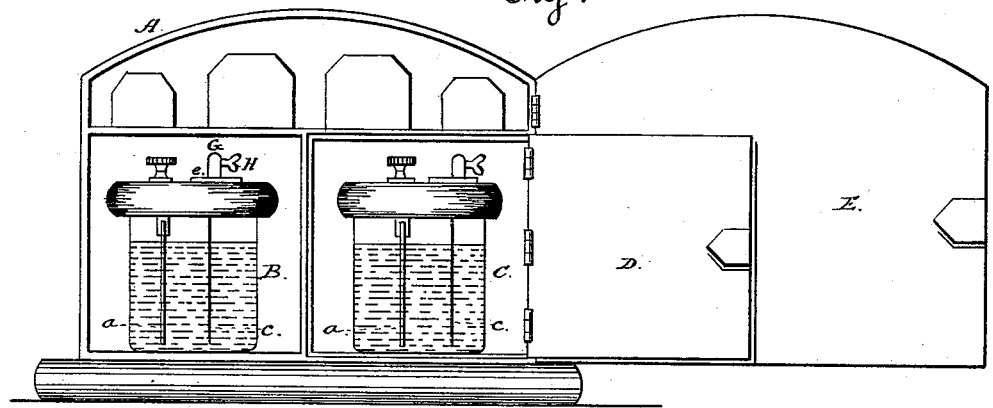
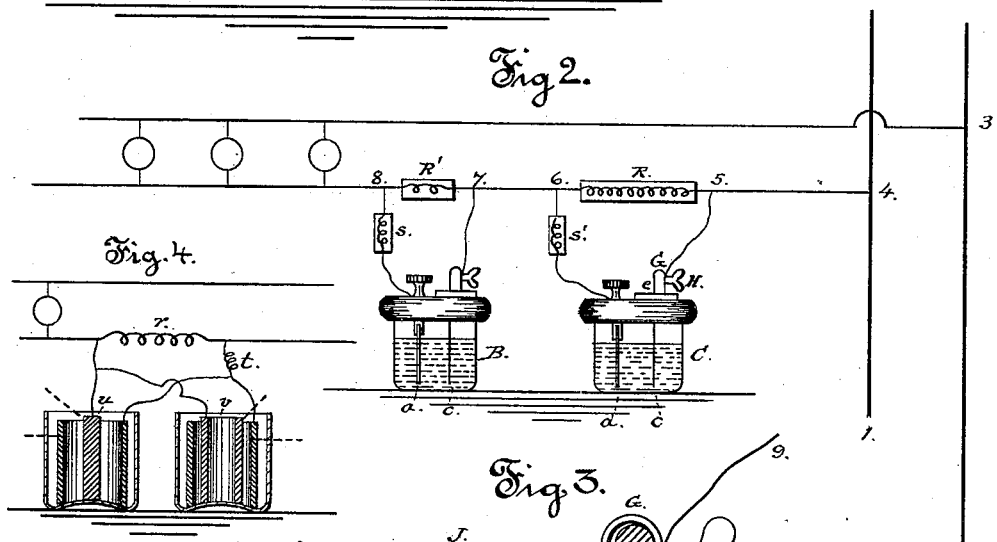
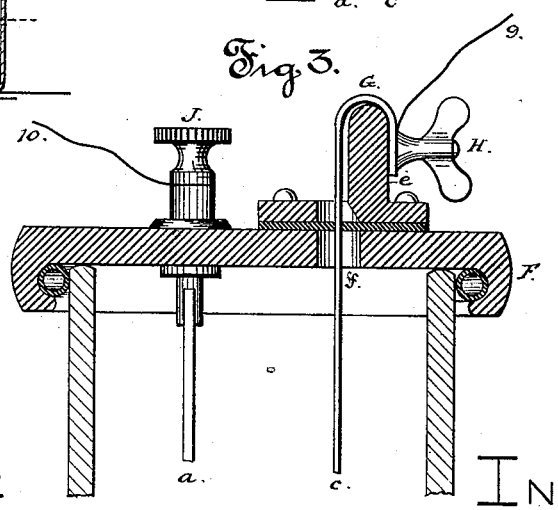
ATTEST:
D. D. Mott
N. W. Seely
INVENTOR:
T. A. Edison
per Dyer and Wilber
Attys.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

WEBERMETER.

SPECIFICATION forming part of Letters Patent No. 251,557, dated December 27, 1881.

Application filed May 27, 1881. (No model.)

*To all whom it may concern:*

Be it known that I, THOMAS A. EDISON, of Menlo Park, in the county of Middlesex and State of New Jersey, have invented a new and useful Improvement in Webermeters; and I do hereby declare that the following is a full and exact description of the same, reference being had to the accompanying drawings, and to the letters of reference marked thereon.

My invention relates to apparatus for measuring the quantity of electric current passing through a circuit in a given time, and is one of those devices to which in prior patents I have applied the name "Webermeter."

It has for its object the insuring of greater accuracy in recording when in various conditions as to temperature.

My arrangement generally consists of an electro-depositing cell, the anode and cathode of which are plates whose weight has been carefully determined. It is placed in a shunt-circuit to that of which the current is to be measured, the latter containing a resistance, so that a definite proportional part of the current will be shunted through the cell. After the lapse of a proper interval of time the cathode and anode plates are weighed and the difference in weight noted, this difference showing the amount of current which has passed through the shunt. In practice it is preferable, because more convenient, to weigh only the cathode and its increase noted, whence the current passing through the cell may be determined, and as it is proportioned to the current in the main circuit the latter is then readily ascertainable. Upon passage of the current through the cell the fluid therein is heated. It may be to a very small extent, still it is heated somewhat. This heating diminishes the resistance of the cell, and consequently a proportionately increased amount of current passes therethrough, making an appreciable source of error. To remedy this a resistance should be used in the cell-circuit equally susceptible to the heating influences of the current, but whose resistance increases as it is heated. By this means, as the resistance of the cell is diminished, the artificial resistance in its circuit is increased, so that the entire resistance of the shunt or electro-depositing circuit is maintained constant. For this purpose a fine copper wire answers well. This resistance must be proportioned to that of the cell. For instance, if the latter contains a twenty per cent. solution of copper sulphate, the copper-wire resistance must be three times as great as that of the cell, in order that they may continue to balance and render nugatory the effects of a rise and fall of temperature.

In practice it may be well to use two cells, in one of which the deposition takes place with greater rapidity than in the other, the former being opened, inspected, and weighed at proper intervals, while the latter is kept locked and used as a "check-meter," to insure absolute correctness in the charges and to protect the seller of electricity from fraud.

Suitable devices for carrying my invention into effect are shown in the drawings, in which—

Figure 1 is a sectional view of a box or case containing two cells, which constitute a meter; Fig. 2, a sectional view of the two cells, showing the circuit-connections and resistances; Fig. 3, a section of two cells of another form which may be used; and Fig. 4, a detail view, in section, of a portion of one cell.

A is a box containing the two electro-depositing cells B C, one of which, B, is arranged to deposit with greater rapidity than the other, this being easily accomplished by varying either the size of the plates, their distance apart, the strength of the solution, or the amount of current shunted through it. The box has two doors, one of which, D, incloses only the cell C, which is intended to be kept locked, while the outer door, E, is opened for inspection of the cell B.

In Fig. 2, 1 2 are the main conductors, from which a derived or multiple-arc circuit, 3 4, leads into a house in which the meter B C is placed for measuring the current passing through the house. Resistances R R' deflect portions of the current into the shunt-circuits 5 6 and 7 8, the resistance R' being less than R, so that a greater current enters the cell B than that which passes through C.

*a a* are the anode and *c c* the cathode plates, the former being arranged so as to be withdrawn from the cell, while the latter is permanently fixed therein.

S S' are resistances, of fine copper wire, placed in the shunt-circuits.

In Fig. 3 the arrangement for readily removing the cathode-plate is shown. A projection, e, with a rounded top, extends above the top F of the cell, and the cathode-plate is made with a curved or hooked portion, G, which hangs over e, and is secured by a thumb-screw, H, which also serves to secure the wire 9. The cathode passes through an aperture, f, into the cell. The anode is held firmly, connections thereto being made from the wire 10 by means of a set-screw, J.

The operation of these devices is as follows: Current passing through the shunt-circuit 7 8 deposits copper on the cathode c of the cell B. The heating effects of the current are proportional in the solution and in the resistance S; but while the resistance of the solution is diminished thereby the resistance of S is increased—that is, if the resistance S be properly proportioned to that of the solution, as hereinbefore set forth, its increase of resistance automatically compensates for the decrease of resistance of the solution, the result being that the total resistance of the circuit is maintained constant, so that the proportion of current passing therethrough remains fixed.

When measurements are desired the door E is opened to obtain access to the cell B, the thumb-screw H is loosened, and the plate C raised from the cell, and its increase of weight determined. From this the current passing through the main line is computed.

If it is desired to substantiate or prove the indications of the cell B, the cell C is examined and its cathode weighed, this cell being arranged to allow of a smaller amount of deposition than the cell C. For convenience the two cells are so arranged and adjusted that the rate of deposition in one is a multiple of that in the other. A convenient arrangement for this is shown in Fig. 4, where cylindrical plates are used, the cathode-plates $u$ $v$ being of different diameters, making in one cell the distance from anode to cathode much greater than in the other. Of course the diameter of the cathodes might remain constant and that of the anodes be varied to produce the same result. As shown, these two cells are arranged while each is in its own branch circuit, so as to require but one shunting resistance $r$ and but one compensating resistance $t$.

What I claim as my invention is—

1. A webermeter consisting of two electro-depositing cells, each in a separate derived circuit of the common main circuit, one of which deposits with greater rapidity than the other, substantially as and for the purposes described.

2. The combination, with an electro-depositing cell, of a resistance whose increase automatically compensates for the decrease in resistance of the cell due to the action of the current, substantially as set forth.

3. The combination, in an electrolytic cell, of a plate having a curved or hooked exterior extremity, a cover for the cell having an aperture through which said plate may be passed, a projection secured to the cover contiguous to the aperture and extending upwardly to receive the hooked or curved extremity of the plate, and a set-screw mounted thereon, substantially as and for the purposes set forth.

4. The combination, in a webermeter, of two electro-depositing cells, the plates in one being a greater distance apart than are those in the other, substantially as and for the purposes set forth.

This specification signed and witnessed this 19th day of May, 1881.

THOS. A. EDISON.

Witnesses:
H. W. SEELY,
RICHD. N. DYER.